United States Patent
Cady et al.

(10) Patent No.: US 8,294,691 B2
(45) Date of Patent: Oct. 23, 2012

(54) WAVEGUARD TOUCH PANEL

(75) Inventors: Andrew Cady, Chicago, IL (US); Tomo Ishikawa, Evanston, IL (US); Robert D. Polak, Lindenhurst, IL (US)

(73) Assignee: Motorola Mobility LLC, Libertyville, IL (US)

( * ) Notice: Subject to any disclaimer, the term of this patent is extended or adjusted under 35 U.S.C. 154(b) by 888 days.

(21) Appl. No.: 12/271,411

(22) Filed: Nov. 14, 2008

(65) Prior Publication Data

US 2010/0123683 A1    May 20, 2010

(51) Int. Cl.
*G06F 3/042*    (2006.01)
(52) U.S. Cl. ......................................... 345/175; 345/176
(58) Field of Classification Search ........... 345/173–178
See application file for complete search history.

(56) References Cited

U.S. PATENT DOCUMENTS

| | | | |
|---|---|---|---|
| 7,053,887 B2 | 5/2006 | Kraus et al. | |
| 7,098,592 B2 | 8/2006 | Nishikawa et al. | |
| 7,265,748 B2 | 9/2007 | Ryynanen | |
| 2004/0140961 A1* | 7/2004 | Cok | 345/175 |
| 2004/0212603 A1 | 10/2004 | Cok et al. | |
| 2005/0128190 A1* | 6/2005 | Ryynanen | 345/173 |
| 2006/0274046 A1* | 12/2006 | Hillis et al. | 345/173 |

FOREIGN PATENT DOCUMENTS

JP    10-027067    1/1998

* cited by examiner

*Primary Examiner* — Hoa T Nguyen
*Assistant Examiner* — Andrew Sasinowski (57) ABSTRACT

A method and apparatus are provided for detecting activation of a touch panel. The method includes the steps of providing an N by M touch panel including a matrix of N rows of touch elements along a first axis and M columns of touch elements along a second axis, providing N optical beams where a characteristic of each beam of the N beams is different than the corresponding characteristic of any other of the N optical beams, where the summation of a characteristic any first group of the N optical beams is different than the summation the corresponding characteristic of any other N beams and where each respective beam of the N optical beams corresponds to an input of each of the N rows; and summing the characteristic from an output of each of the N rows.

21 Claims, 6 Drawing Sheets

WAVEGUARD TOUCH PANEL

FIELD OF THE INVENTION

The field of the invention relates to user interfaces for control of portable devices and more particularly to touch panels.

BACKGROUND OF THE INVENTION

Touch panels are often used on portable electronic devices (e.g., cell phones, PDAs, etc.) for purposes of controlling the device. In the case of a cell phone, the touch panel may include touch sensitive areas or keys for the digits 0-9 as well as touch sensitive areas for specialized purposes such as placing calls or ending calls. In the case of a PDA, the touch panel may include a full QWERTY keyboard as well as ON-OFF functions.

Touch panels are typically constructed with a two-dimensional array or matrix of touch sensitive areas that function as conventional pushbuttons. In some touch panels, e.g., resistive touch panels, several layers of materials, separated by thin spacers, may be used to form the two dimensional array. A surface of the touch panel is typically constructed of a single piece of material that covers the touch sensitive areas. The spacers may surround each of the touch sensitive areas. A user may activate the touch sensitive area by pressing on the surface of the touch sensitive area thereby deforming a top surface of the touch sensitive area towards an underlying layer.

The underside of the top layer may include a capacitive or resistive material that causes a change that is detected by a touch panel interface. Alternatively, the deformation of the top surface may interrupt an optical beam traveling through the touch sensitive area.

In general, each row and column of the array provides an output value. When a user activates a touch sensitive area, the row and column in which the activated touch sensitive area is located provides an output or fails to provide an output depending upon the technology.

The touch panel interface may detect activation of the touch sensitive area via an optical or electrical detector connected to each row and each column of the touch panel. While providing an optical or electrical detector for each row and column is effective, it is expensive. Accordingly, a need exists for simpler methods of identifying activated touch sensitive areas of touch panels.

SUMMARY

A method and apparatus are provided for detecting activation of a touch panel. The method includes the steps of providing an N by M touch panel including a matrix of N rows of touch elements along a first axis and M columns of touch elements along a second axis, providing N optical beams where a characteristic of each beam of the N beams is different than the corresponding characteristic of any other of the N optical beams, where the summation of a characteristic any first group of the N optical beams is different than the summation the corresponding characteristic of any other N beams and where each respective beam of the N optical beams corresponds to an input of each of the N rows; and summing the characteristic from an output of each of the N rows. The method further includes the steps of providing M optical beams where a characteristic of each beam of the M beam is different than the corresponding characteristic of any other of the M optical beams, where the summation of a characteristic of any first group of the M optical beams is different than the summation the corresponding characteristic of any other M beams and where each respective beam of the M optical beams corresponds to an input of each of the M columns, summing the characteristic from an output of each of the M columns and unambiguously identifying a touch element of the N rows and M columns of touch elements based upon the summation of the outputs.

DETAILED DESCRIPTION OF AN ILLUSTRATED EMBODIMENT

Figure 1:
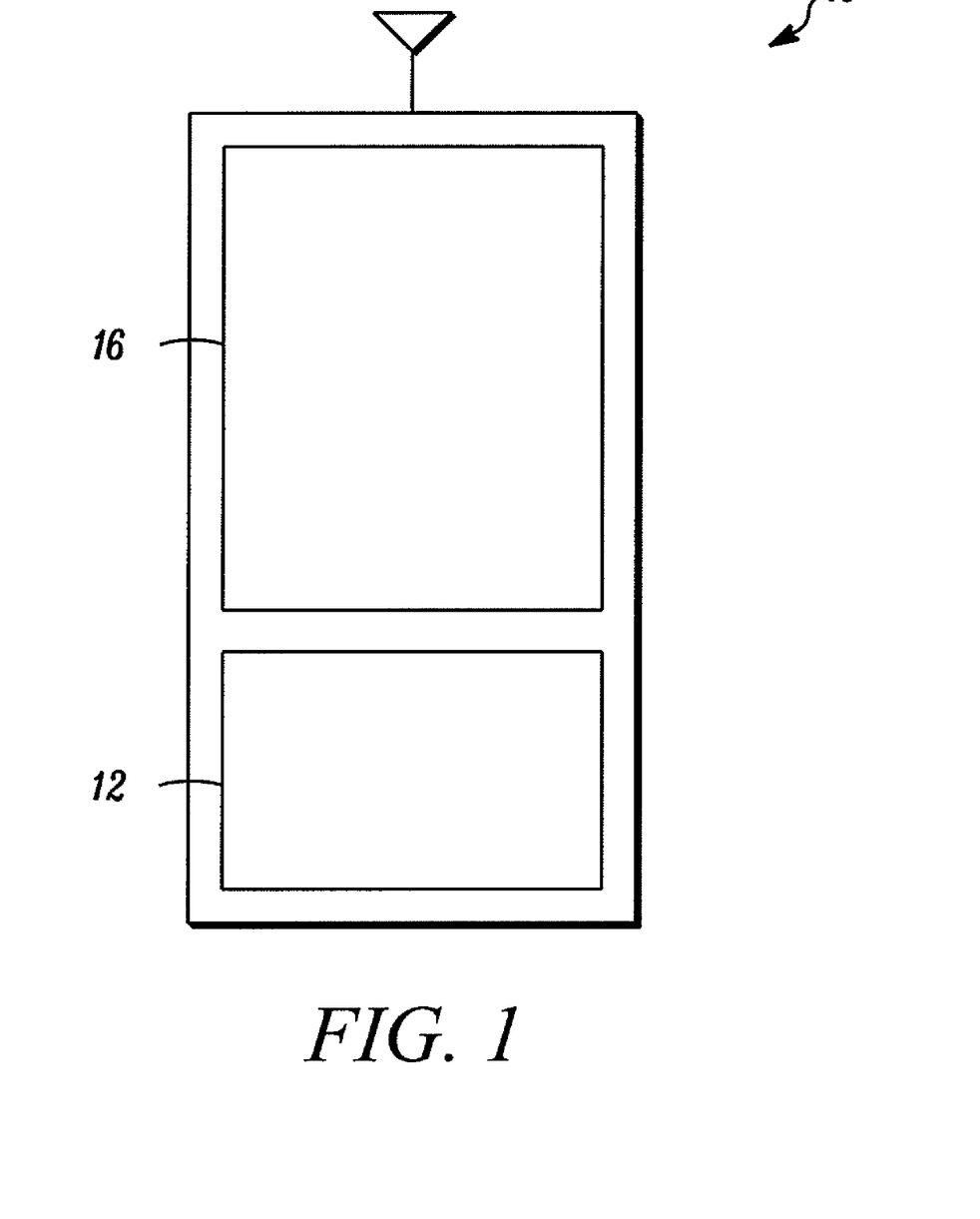
FIG. 1 depicts a portable electronic device in accordance with an illustrated embodiment of the invention.

FIG. 1 is a portable electronic device (e.g., a cellphone, PDA, etc.) 10 shown generally in accordance with an illustrated embodiment of the invention. Included within the electronic device 10 is a display 16 and a touch panel 12. Although the display 16 and touch panel 12 are shown as separate devices in FIG. 2, it should be understood that the display 16 and touch panel 12 could be integrated into a single touch panel display.

Figure 2:
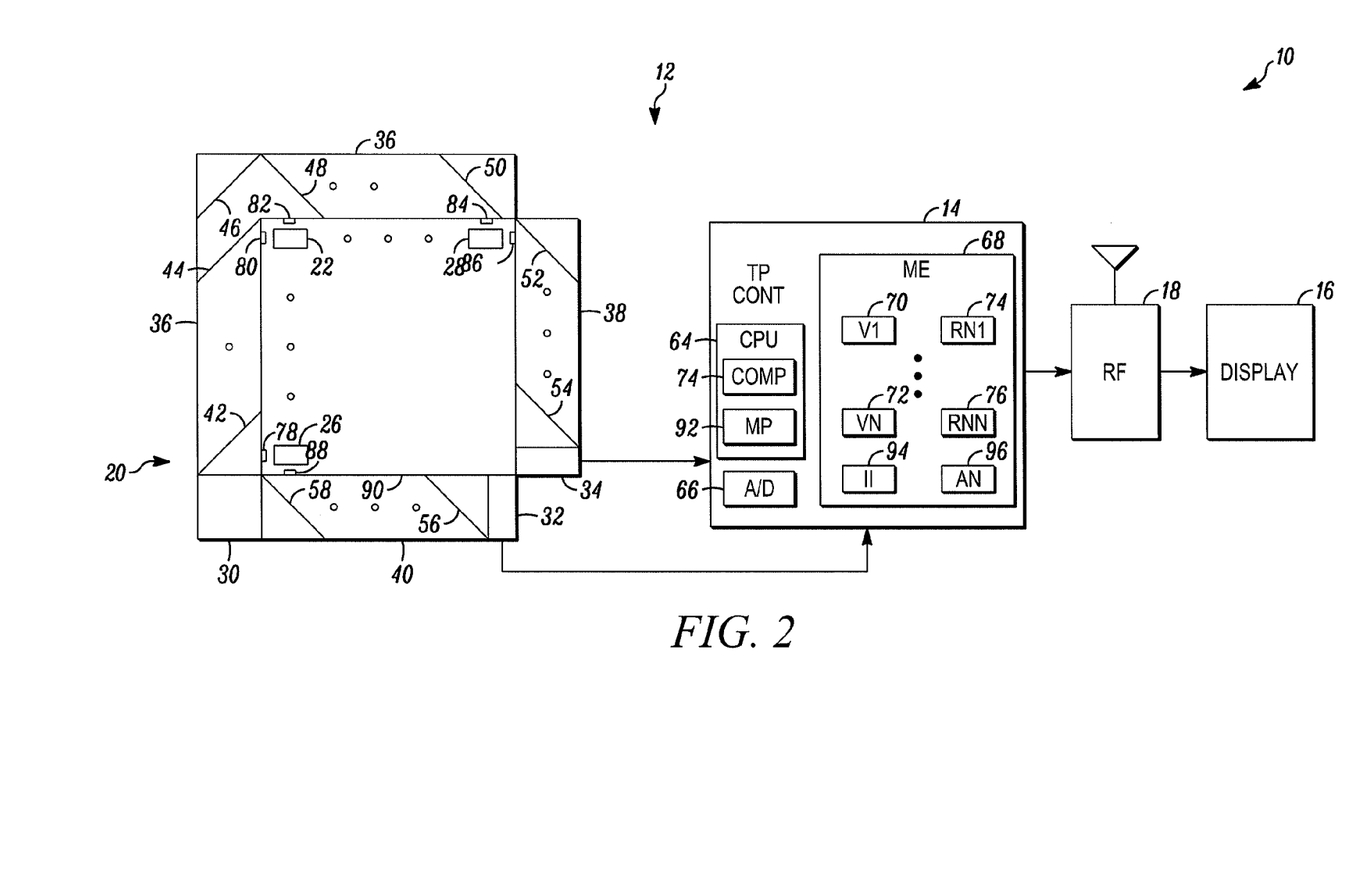
FIG. 2 is a block diagram of the electronic device of FIG. 1.

FIG. 2 is a block diagram of the electronic device 10. As shown, the touch panel 12 may include an optical panel 20 and an interface 14 that detects activation of the touch sensitive sites of the touch panel 20.

The optical panel 20 includes two or more rows and columns of touch sensitive sites (also sometimes referred to as touch elements or keys) 22, 26, 28. For example, if the electronic device 10 is a telephone, then the device would include touch sensitive sites labels 0-9 with still other touch sensitive sites labeled MAKE CALL and END CALL.

The touch panel 20 may also include an optical source (e.g., a laser diode, point light source with collimating lens, etc) 30 and first and second optical detectors 32, 34. The optical source 30 may include an optical distribution waveguide 36 that distributes optical energy from the optical source 30 along two adjacent edges of the panel 20. Once delivered to the adjacent edges, the delivered light propagates through the panel 20 to opposing sides.

The touch panel 20 includes a first optical waveguide 40 that receives output light from a first opposing edge of the panel 20 (i.e., along the bottom horizontal edge) and that guides the output light into the first optical detector 32. Similarly, the touch panel 20 includes a second optical waveguide 38 that receives output light from a second opposing edge of the panel 20 (i.e., along the right-side vertical edge) and that guides the output light into the second optical detector 34. A characteristic of the light (e.g., magnitude) received along the horizontal and vertical edges by the detectors 32, 34 is coupled to a touch panel controller 14 that identifies the touch sensitive area 22, 26, 28 that has been activated by comparing the measured magnitude with a set of reference values.

Included within the waveguide 36 may be a series of optical diverters 42, 44, 46, 48, 50 including a first series of optical diverters 42, 44 that are equal to the number of rows of touch sensitive sites 22, 26 within the optical panel 20 and a second series of optical diverters 48, 50 that are equal to the number of columns of touch sensitive sites 22, 28 in the optical panel 20. The optical diverters 42, 44 function to transmit a portion of impinging optical energy traveling parallel the input edge and to divert another portion across the panel 20 perpendicular to the input edge to the opposing edge.

The waveguides 38, 40 are also provided with a number of optical diverters 52, 54, 56, 58. In this case, the diverters 52, 54 couple optical energy received from a respective row of the optical panel 20 into the detector 34. Similarly, the diverters 56, 58 couple optical energy received from a respective column of the optical panel 20 into the detector 32. In effect, the diverters 52, 54 sum a characteristic (e.g., the optical amplitudes) of the rows of the panel 20 while couplers 56, 58 sum the characteristic of the columns.

The optical panel 20 may be fabricated using an injection molding process. The touch panel 20 may be molded with a number of optical waveguides in the horizontal direction and another number in the vertical direction. Under one illustrated embodiment, the waveguides 78, 80, 82, 84, 86, 88 are provided along the four edges of the panel 20. The waveguides 78, 80, 82, 84, 86, 88 may be relatively short, stub waveguides extending between an outside marginal edge of the panel 20 and the touch sensitive areas. The respective waveguides 78, 80, 82, 84, 86, 88 modulate an amplitude of light received from the source 30 and collimate the modulated beam of light that travels across each row and column. The waveguides 78, 80, 82, 84, 86, 88 may include a lens on one or both ends.

The waveguides 78, 80, 82, 84, 86, 88 along the edges are somewhat elevated from a recessed center portion of the panel 20 that is surrounded by the waveguides. Under this embodiment, the intersection of each row and column of the recessed center portion is imprinted with an appropriate legend (e.g., 0 to 9, etc.) of the associated touch panel key. To activate a particular touch sensitive area 22, 26, 28, a user simply places a finger in the appropriate area and the presence of the user's finger blocks the optical energy propagating between respective sets of waveguides (e.g., 80 and 82, 82 and 88, etc.) on opposing sides of the particular row and column.

While each row and column of FIG. 2 is shown as having a pair of waveguides, it should also be understood that in other embodiments, only a single waveguide would be needed for each row or column. In this case, the single waveguide 78, 80, 82, 84 may be located on the source end of the row or column.

Figure 3:
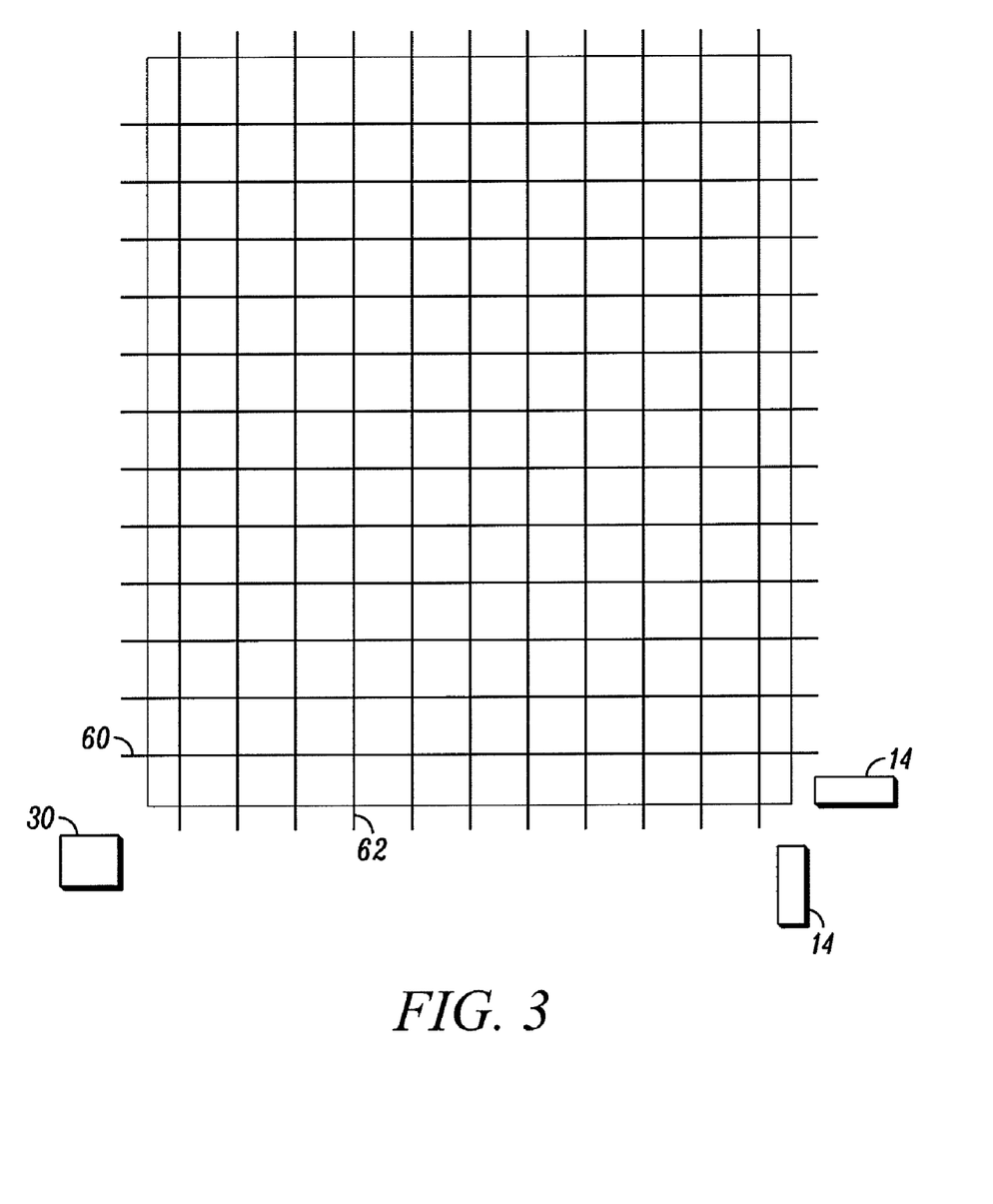
FIG. 3 depicts the touch panel of the diagram of FIG. 2.

FIG. 3 depicts the optical beams 60, 62 transmitted across the touch panel 10 in the horizontal and vertical directions for an 11×12 touch panels. The different thickness of the beams 60, 62 of FIG. 3 represent different optical signals, e.g., intensity, amplitude, phase, energy, etc., (and corresponding cross-sectional areas of each of the waveguides 78, 80, 82, 84, 86, 88). The intersection of each of the optical beams represent a touch panel activation site.

Under another illustrated embodiment, the recessed area of the touch panel 20 may be protected by a thin flexible cover 90. Spacers 91 may be provided in each of the corners of the touch sensitive areas 22, 26, 28 so that when a user activates one touch sensitive area 22, 26, 28, the cover 90 doesn't block light beams 60, 62 across adjacent touch sensitive areas 22, 26, 28.

Under this embodiment, the intersection of each of the optical beams 60, 62 occurs in a space between an upper cover 90 and recessed base of the optical panel 20. The set of spacers 86 at the corners of the touch sites allow a user to press a portion of the upper cover downward at the site of the intersection, thereby blocking the optical signals at the intersection of a particular row and column.

As noted above, the cross-sectional area of each waveguide 78, 80, 82, 84, 86, 88 of the rows or columns is formed during the manufacturing process, e.g. by injection molding. As shown in FIG. 3, the optical intensity and cross-sectional area of each of the wave guides 78, 80, 82, 84, 86, 88 is manufactured to be different than the cross-sectional area of any other of the respective rows or columns.

In addition to the cross-sectional areas of the rows and columns of the waveguides 78, 80, 82, 84, 86, 88 all being different, the cross-sectional areas are chosen so that the sum of total energy of any first group of rows are different than the sum of optical signals of any other group of rows. Similarly, the sum of optical signals of any first group of columns are different than the sum of optical signals of any other group of columns.

For example, the touch panel 20 may include a 10×10 array of touch sensitive sites 22, 26, 28. A first row and first column may have optical waveguides with a reference cross-sectional area and a reference optical signal equal to $I_1$. The next waveguide $I_2$. (e.g., the second row or the second column) may have an optical signal of $I_1 \sqrt{2}$ (i.e., $I_2=I_1 \sqrt{2}$). Similarly, the third waveguide $I_3$ may have an optical signal equal to $I_1 \sqrt{3}$ the fourth waveguide $I_4$ may have an optical signal equal to $I_1 \sqrt{5}$, the fifth waveguide $I_5$ may have an optical signal equal to $I_1 \sqrt{6}$, the sixth waveguide $I_6$ may have an optical signal equal to $I_1 \sqrt{7}$ the seventh waveguide $I_7$ may have an optical signal equal to $I_1 \sqrt{11}$, the eighth waveguide $I_8$ may have an optical signal equal to $I_1 \sqrt{13}$, the ninth waveguide $I_9$ may have an optical signal equal to $I_1 \sqrt{15}$ and the tenth waveguide $I_{10}$ may have an optical signal equal to $I_1 \sqrt{17}$. Stated in mathematical terms $I_{total}=I_1+I_2+\ldots+I_m$, where $I_k \neq I_i+I_j$ for all $0<i,j,k \leq m$.

The use of the non-coincident intensities from each row and column allows activated touch sites to be identified using processing features with minimum complexity. For example, a central processing unit (CPU) 64 within the touch panel interface 14 may periodically activate an analog to digital converter (ADC) 66 to measure the cumulative optical signal impinging on optical detectors 32, 34.

Included within the touch panel interface 14 may be a memory with a table 68 of cumulative signal values 70, 72 and an associated reference identifier 74, 76 of a key 22, 26, 28. In order to determine which touch sensitive area 26, 26, 28 has been activated, the CPU 64 may retrieve a cumulative signal value for each of the rows and columns and compare the cumulative signal values with the entries 70, 72 within memory to identify the touch sensitive area 22, 26, 28 that was activated.

For example, using the example above of the 10×10 array, the cumulative value of all rows or all columns may have a reference signal value $I_{reftotal}$ as follows $I_{total}=I_1(1+\sqrt{2}+\sqrt{3}+\sqrt{5}+\sqrt{6}+\sqrt{7}+\sqrt{11}+\sqrt{13}+\sqrt{15}+\sqrt{17})$ in the case where none of the touch sensitive sites or keys 22, 26, 28 are activated. The value $I_{reftotal}$, in fact, may be saved in one of the memory locations 70, 72 as a reference value for verifying the proper operation of the touch panel 20 or for detecting the interim time period between the activation of a sequence of keys 22, 26, 28.

On the other hand, if a first key 22, 26, 28 having the signal value $I_1$ is activated, then the cumulative signal $I_{total}$ measured by one of the detectors 32, 34 would have a value equal to $I_{total}=I_1(\sqrt{2}+\sqrt{3}+\sqrt{5}+\sqrt{6}+\sqrt{7}+\sqrt{11}+\sqrt{13}+\sqrt{15}+\sqrt{17})$. Similarly, if the key 22, 26, 28 having the intensity $I_8$ were activated, then the cumulative signal value measured by the detectors 32, 34 would have a value equal to $I_{total}=I_1(1+\sqrt{2}+\sqrt{3}+\sqrt{5}+\sqrt{6}+\sqrt{7}+\sqrt{11}+\sqrt{15}+\sqrt{17})$.

In order to identify which key has been activated, the processor 64 may use the ADC 66 to first measure a cumulative value $I_{total}$ of the signal of all of the rows using the row detector 34. Upon detecting the value $I_{total}$ the CPU 64 may use a comparator 74 to compare the value $I_{total}$ with each of the reference values 70, 72 within the table 68. When the comparator 74 indicates a substantial match, then the CPU 64 retrieves the row identifier 74, 76 associated with the value 70, 72 that matches the value $I_{total}$.

Next, the CPU 64 uses the ADC 66 to measure a cumulative value $I_{total}$ of all of the columns using the column detector 32. As above, the CPU 64 may use the comparator 74 to compare the column value $I_{total}$ with each of the reference value 70, 72 to find a match. When a match is found, the CPU 64 retrieves the associated identifier 74, 76 to identify the column associated with the match.

Upon determining the row number and column number, the touch panel interface 14 unambiguously identifies the intersection of the row and column and, ultimately, the touch site 22, 26, 28 that has been activated. Upon determining the touch site 22, 26, 28, the interface 14 transfers an identifier of the touch site 22, 26, 28 to a controller 18 of the electronic device 10.

The unambiguous identification of the touch site 22, 26, 28 may include the formulation and transfer of an identifier of the touch site 22, 26, 28 by an matrix processor 92 to the controller 18 under the format $K_{ij}$, where i identifies the row and j identifies the column of the touch panel 12. Alternatively, the matrix processor 92 may use the row and column number 94 as an entry into a lookup table to retrieve an identifier of the selected key (e.g., 0-9, MAKE CALL, END CALL, etc.).

As described above, the sum of optical signals of any first group of columns are different than the sum of optical intensities of any other group of columns. Stated in mathematical terms $I_{total}=I_1+I_2+ \ldots +I_m$, where $I_k \neq I_i+I_i+I_j$ for all $0<i,j$, $k \leq m$. In the case where $I_{total}=I_1+I_2+\ldots+I_m$ and $I_k+I_j \neq I_i+I_j$ for all $0<i,j,k \leq m$, two simultaneous touch events, multi-touch herein after, at two distinct touch elements (a dual-touch or simplest multi-touch) can be identified. Note that the 10×10 array example described above satisfies this criteria as will many other arrays of numbers. One skilled in the art may prepare larger arrays that satisfy the conditions necessary for unambiguously identifying a multi-touch whereby two or more simultaneous touch events occur at two or more distinct touch elements.

Figure 4:
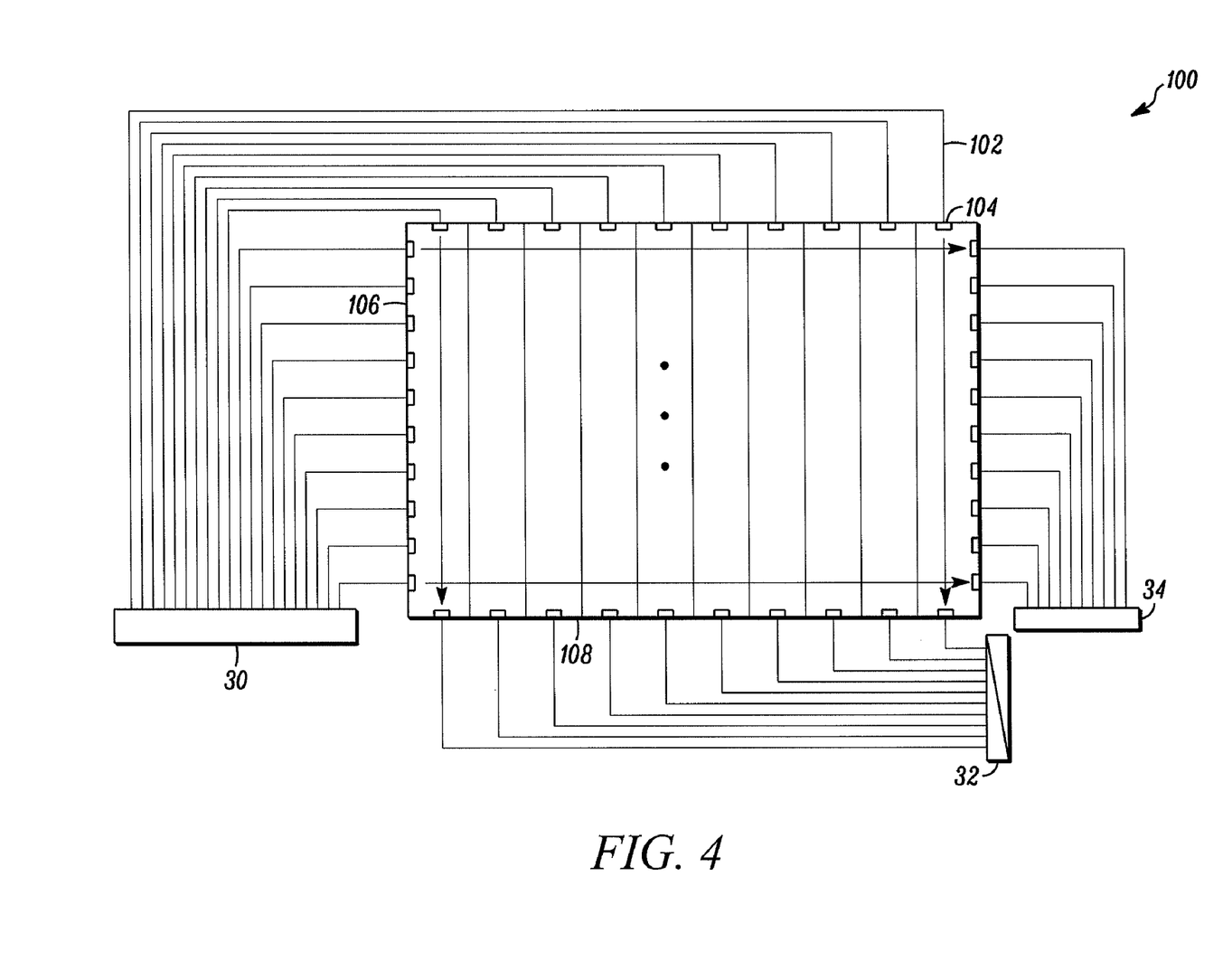
FIG. 4 depicts a touch panel of the diagram of FIG. 2 under an alternate embodiment.

Under another illustrated embodiment, the waveguides 78, 80, 82, 84, 86, 88 may be continuous between the source 30 and input panel edge 106 and between the opposing output panel edge 108 and respective optical detectors 32, 34. FIG. 4 shows an example where a waveguide 78, 80, 82, 84, 86, 88 (now labeled 102) extends from the source 30 to the input edge of the optical panel 100. The waveguide 102 may be coupled to a lens 104 that by itself or in conjunction with the waveguide 102, provides the appropriate optical signal where each row and column has a different optical signal and the sum of each combination is different.

The touch panel 100 may be fabricated by first coating a substrate with an underclad material and then a core material where the underclad and core material are both polymers, but each has a different index of refraction. Once the underclad and core material have been deposited, a photolithography and etching process may be used to create the waveguides 102 and lens 104. A quartz mold may be placed over the etched waveguides 102 and lenses 104 and a varnish may be placed over the etched waveguides 102 and lenses 104 to complete the touch panel 100 shown in FIG. 4. As above, the touch panel 100 of FIG. 4 could be protected by a flexible upper cover 90.

Figure 5:
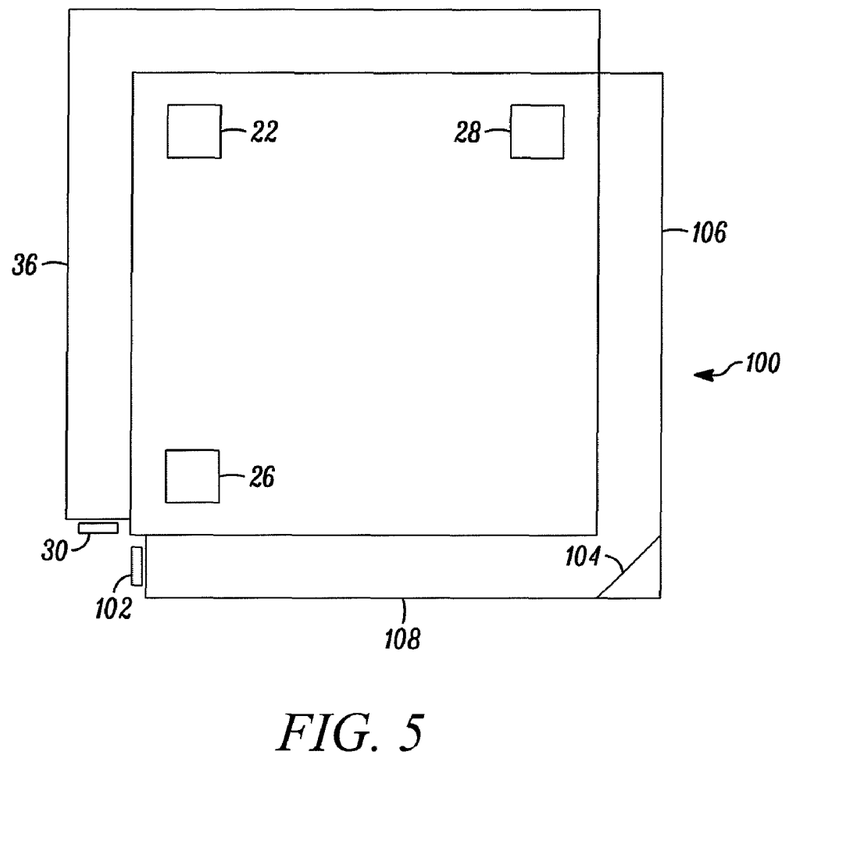
FIG. 5 depicts a touch panel of the diagram of FIG. 2 under another alternate embodiment.

Under another illustrated embodiment, the waveguides 38, 40 of FIG. 2 are combined into a single waveguide 100 as shown in FIG. 5 and a single detector 102. As shown, an optical diverter 104 redirects optical energy received from the rows through a first portion 106 of the waveguide 100 into a second optical portion 108 where the optical energy from the rows is combined with the energy from the columns.

Figure 6:
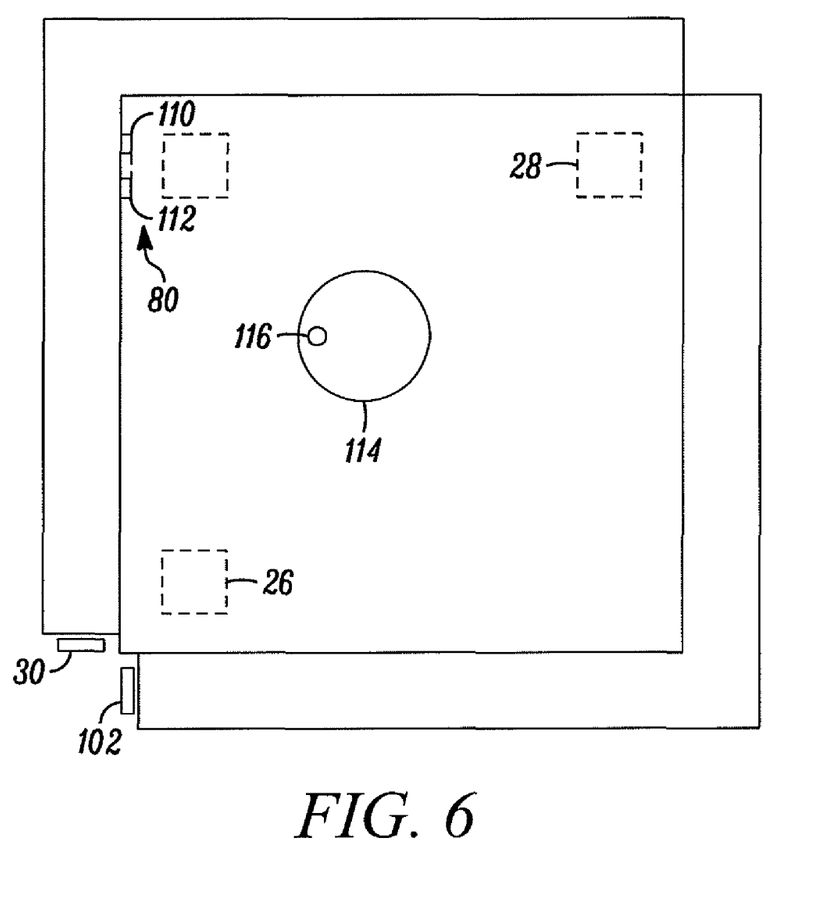
FIG. 6 depicts a touch panel of the diagram of FIG. 2 under still another alternate embodiment.

Under another illustrated embodiment, the waveguides 78, 80, 82, 84, 86 88 are each replaced with a plurality of sub-waveguides 110, 112 as shown in FIG. 6, where each sub-waveguide 110, 112 provides a sub-beam that has the same optical energy provided by the originally described respective waveguide 78, 80, 82, 84, 86 88. This arrangement has the advantage that a stylus 116 or finger 114 may be used to activate the respective touch sensitive areas 22, 26, 28.

Under another embodiment, the optical beams may each have a unique characteristic imposed upon the respective beams using any of a number of different methods (e.g., intensity, amplitude, phase, energy, polarization etc.). For example, some of the beams N, M may use intensity (as discussed above), while others may use polarization, or phase imposed by an appropriate rotator. Any method or combination of methods may be used.

A specific embodiment of method and apparatus for unambiguously identifying a touch sensitive site on a touch panel has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of detecting activation of a touch panel comprising:
   providing an N by M touch panel including a matrix of N rows of touch elements along a first axis and M columns of touch elements along a second axis;
   providing N optical beams where a respective characteristic of each beam of the N beams is formed by a cross-sectional area of a waveguide of the beam and where the respective characteristic and waveguide of the beam is different than the corresponding characteristic and waveguide of any other of the N optical beams, where the summation of a characteristic of any first group of the N optical beams is different than the summation of the corresponding characteristic of any other N beams and where each respective beam of the N optical beams corresponds to an input of each of the N rows;
   summing the characteristic from an output of each of the N rows;
   providing M optical beams where a respective characteristic of each beam of the M beams is formed by a cross-sectional area of a waveguide of the beam and where the respective characteristic and waveguide of the beam is different than the corresponding characteristic and waveguide of any other of the M optical beams, where the summation of a characteristic of any first group of the M optical beams is different than the summation of the corresponding characteristic of any other M beams and where each respective beam of the M optical beams corresponds to an input of each of the M columns;

summing the characteristic from an output of each of the M columns; and unambiguously identifying a touch element of the N rows and M columns of touch elements based upon the summation of the outputs.

2. The method of detecting activation of a touch panel as in claim 1 wherein the N and M beams each further comprise a plurality of optical sub-beams.

3. The method of detecting activation of a touch panel as in claim 2 wherein the step of unambiguously identifying the touch element further comprises measuring an optical signal of the N rows and M columns and comparing the measured magnitude of the summed optical signals of the N rows and M columns with a plurality of respective reference values.

4. The method of detecting activation of a touch panel as in claim 1, wherein the said method additionally unambiguously identifies multi-touch elements of the N rows and M columns of touch elements based upon the summation of outputs.

5. The method of detecting activation of a touch panel as in claim 1 further comprising defining the characteristic of the M and N beams as an optical signal equal to one the of plurality of values selected from the group consisting of 1, $\sqrt{2}$, $\sqrt{3}$, $\sqrt{5}$, $\sqrt{6}$, $\sqrt{7}$, $\sqrt{11}$, $\sqrt{13}$, $\sqrt{15}$ and $\sqrt{17}$.

6. The method of detecting activation of a touch panel as in claim 5 further comprises providing a source waveguide for each of the rows and columns with a relative cross-sectional area equal to a different respective one of the values selected from the group.

7. The method of detecting activation of a touch panel as in claim 6 wherein the source waveguide further comprises a continuous waveguide from an optical source to the respective row and column.

8. An apparatus for detecting activation of a touch panel comprising:

an N by M touch panel including a matrix of N rows of touch elements along a first axis and M columns of touch elements along a second axis;

means for providing N optical beams where a respective characteristic of each beam of the N beams is formed by a cross-sectional area of a waveguide of the beam and where the respective characteristic and waveguide of the beam is different than the corresponding characteristic and waveguide of any other of the N optical beams, where the summation of a characteristic any first group of the N optical beams is different than the summation of the corresponding characteristic of any other N beams and where each respective beam of the N optical beams corresponds to an input of each of the N rows;

means for summing the characteristic from an output of each of the N rows;

M optical beams where a respective characteristic of each beam of the M beam is formed by a cross-sectional area of a waveguide of the beam and where the respective characteristic and waveguide of the beam is different than the corresponding characteristic and waveguide of any other of the M optical beams, where the summation of a characteristic of any first group of the M optical beams is different than the summation of the corresponding characteristic of any other M beams and where each respective beam of the M optical beams corresponds to an input of each of the M columns;

means for summing the characteristic from an output of each of the M columns; and means for unambiguously identifying a touch element of the N rows and M columns of touch elements based upon the summation of the outputs.

9. The apparatus for detecting activation of a touch panel as in claim 8 the N and M beams each further comprise a plurality of optical sub-beams.

10. The apparatus for detecting activation of a touch panel as in claim 8 wherein the means for unambiguously identifying the touch element or multi-touch elements further comprises means comparing the summed characteristic of the N rows and M columns with a plurality of respective reference values.

11. The apparatus for detecting activation of a touch panel as in claim 8 wherein each the characteristic of the M and N beams further comprise an optical signal equal to one the plurality of values selected from the group consisting of 1, $\sqrt{2}$, $\sqrt{3}$, $\sqrt{5}$, $\sqrt{6}$, $\sqrt{7}$, $\sqrt{11}$, $\sqrt{13}$, $\sqrt{15}$ and $\sqrt{17}$.

12. The apparatus for detecting activation of a touch panel as in claim 11 further comprises means for providing a source waveguide for each of the rows and columns with a relative cross-sectional area equal to a different respective one of the values selected from the group.

13. An apparatus for detecting activation of a touch panel comprising:

an N by M touch panel including a matrix of N rows of touch elements along a first axis and M columns of touch elements along a second axis;

N optical beams where a respective characteristic of each beam of the N beams is formed by a cross-sectional area of a waveguide of the beam and where the respective characteristic and waveguide of the beam is different than the corresponding characteristic and waveguide of any other of the N optical beams, where the summation of a characteristic any first group of the N optical beams is different than the summation of the corresponding characteristic of any other N beams and where each respective beam of the N optical beams corresponds to an input of each of the N rows;

a first optical detector that sums the characteristic from an output of each of the N rows;

M optical beams where a respective characteristic of each beam of the M beam is formed by a cross-sectional area of a waveguide of the beam and where the respective characteristic and waveguide of the beam is different than the corresponding characteristic and waveguide of any other of the M optical beams, where the summation of a characteristic of any first group of the M optical beams is different than the summation the corresponding characteristic of any other M beams and where each respective beam of the M optical beams corresponds to an input of each of the M columns;

a second optical detector that sums the characteristic from an output of each of the M columns; and a matrix processor that unambiguously identifies a touch element of the N rows and M columns of touch elements based upon the summation of the outputs.

14. The apparatus for detecting activation of a touch panel as in claim 13 the N and M beams each further comprise a plurality of optical sub-beams.

15. The apparatus for detecting activation of a touch panel as in claim 13 wherein the matrix processor further comprises a comparator that compares the measured magnitude of the summed optical signal of the N rows and M columns with a plurality of respective reference values.

16. The apparatus for detecting activation of a touch panel as in claim 13 wherein each the characteristic of the M and N beams further comprise an optical signal equal to one the plurality of values selected from the group consisting of 1, $\sqrt{2}$, $\sqrt{3}$, $\sqrt{5}$, $\sqrt{6}$, $\sqrt{7}$, $\sqrt{11}$, $\sqrt{13}$, $\sqrt{15}$ and $\sqrt{17}$.

17. The apparatus for detecting activation of a touch panel as in claim 16 further comprising a source waveguide for each of the rows and columns with a relative cross-sectional area equal to a different respective one of the values selected from the group.

18. The apparatus for detecting activation of a touch panel as in claim 17 wherein the source waveguide further comprises a continuous waveguide from an optical source to the respective row and column.

19. The apparatus for detecting activation of a touch panel as in claim 17 wherein the source waveguide further comprises a stub waveguide extending between an outside marginal edge of the touch panel and touch sensitive areas of the touch panel.

20. The apparatus for detecting activation of a touch panel as in claim 19 further comprising a distribution waveguide from an optical source extending at least one edge of the touch panel and a plurality of optical diverters that divert a portion of optical energy from the continuous waveguide into a stub waveguide of each respective row and column.

21. The apparatus for detecting activation of a touch panel as in claim 13 further comprising a cover disposed over the N by M touch panel and where the N and M optical beams propagate between opposing sides of the touch panel between the cover and a substrate of the touch panel.

* * * * *